C. RUSSELL.
Insect-Destroyer.
No. {1,716; 32,720.}
Patented July 2, 1861.
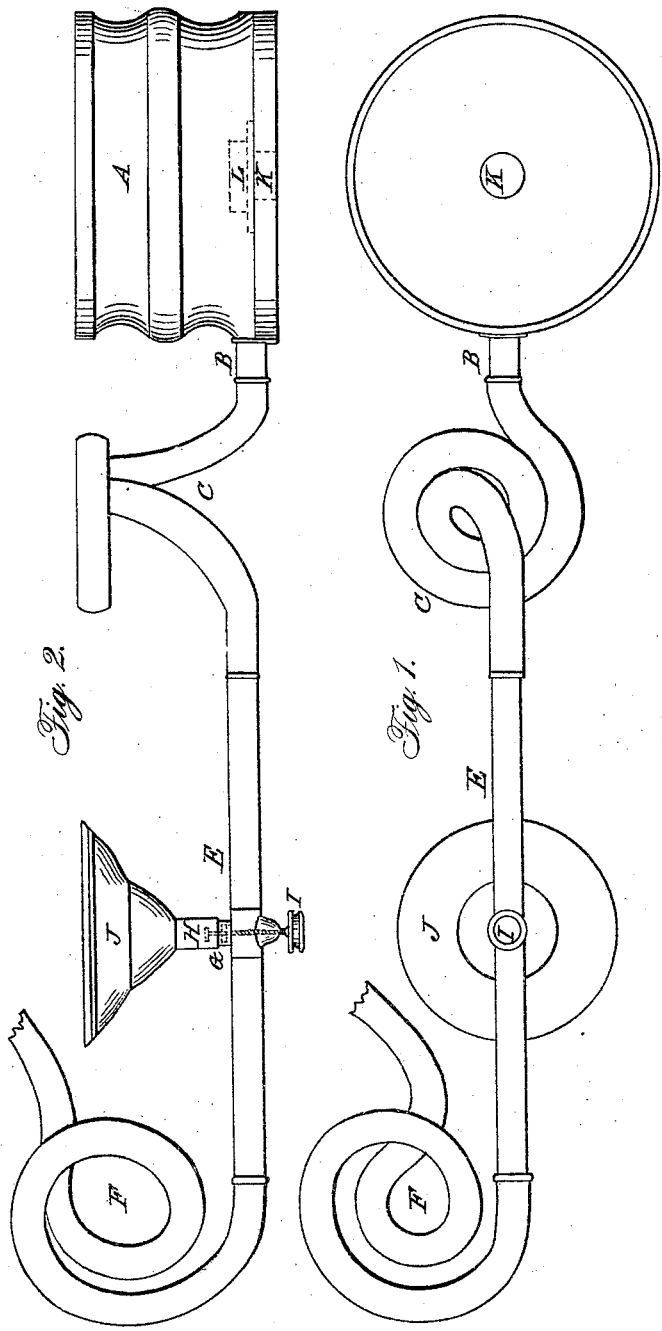
Witnesses:
Inventor:
Caleb Russell

UNITED STATES PATENT OFFICE

CALEB RUSSELL, OF PITTSBURG, PENNSYLVANIA.

APPARATUS FOR DESTROYING INSECTS, REPTILES, &c.

Specification of Letters Patent No. 32,720, dated July 2, 1861.

*To all whom it may concern:*

Be it known that I, CALEB RUSSELL, of Pittsburg, in the county of Allegheny and State of Pennsylvania, have invented a new and useful apparatus for injecting liquid, gaseous, or pulverized substances into the dens, caverns, burrows, nests, or holes of animals, reptiles, or insects to dislodge or destroy them; and I do hereby declare that the same is described and represented in the following specifications and drawings.

To enable others skilled in the art to make and use my invention I will proceed to describe its construction and operation referring to the drawings in which the same letters indicate like parts in each of the figures.

Figure 1, is a plan of the apparatus I have invented. Fig. 2, is an elevation of the same.

The apparatus which I have invented for the purpose above mentioned, consists of a small bellows for blowing air through a flexible pipe, into a pipe having a closed vessel connected to it, to contain the materials or substances to be blown through a second flexible pipe or tube, into the dens, caverns, nests, burrows or holes of animals, reptiles or insects to dislodge or destroy them. The closed vessel being provided with an adjustable valve to enable the operator to graduate and regulate at will, the quantity of liquid, gaseous or pulverized substance supplied, and blown into the retreats of animals, reptiles or insects to drive them out, dislodge or destroy them.

In the accompanying drawings A, is a bellows to blow air through the pipe B, into and through the flexible tube C, and pipe E, and also through the flexible tube F, which may be inserted into the den, cavern, nest, burrow or hole of the animal, reptile or insect to be dislodged or destroyed. There is a short branch pipe G, on the side of the pipe E, provided with an adjustable valve H, shown by dotted lines in Fig. 2, and operated by the screw I, working in a female screw in the pipe E, by which screw the valve may be opened or closed or adjusted so as to graduate the supply of liquid or pulverized material as required.

J, is a vessel with an orifice fitted to the branch pipe G, to which it is applied after being filled with liquid ammonia, or a solution of camphor, asafetida, or such other solution, decoction or pulverized composition, the odor of which will be sufficiently offensive to drive the animal, reptile or insect from his retreat or hiding place, or stupefy or render them so insensible and harmless, that they may be captured without danger; or so poisonous as to destroy them in their holes or retreats by suffocating them.

The hole K, in the bellows and the hinged valve L, are shown by dotted lines in Fig. 2. One side of the bellows may have a strap to hold it against the side of the person using it; and the other side of the bellows may have a strap to hold it to the arm, so as to work the bellows by vibrating the arm and leave the hands at liberty to adjust and hold the apparatus, and tend the trap, placed at the mouth of the hole to receive the animal, reptile or insect, sought to be dislodged from his retreat and caught.

The common flexible india rubber tubing such as is in use for many purposes may be used on my apparatus, and may be easily inserted or thrust into the holes of many animals and reptiles or insects so as to convey the offensive, stupefying or poisonous matter into their remote haunts, to drive them out, or render them harmless, so that they may be captured with facility and without danger, or destroy their lives by suffocation and leave them where they are.

I contemplate that my apparatus may be modified to adapt it to the circumstances in which it is to be used without departing from the principles or merits of my invention.

I believe I have described and represented my invention or apparatus, so as to enable any person skilled in the art, to make and use it for the purposes intended, and I will now state what I desire to secure by Letters Patent to wit:

The adjustable valve H, to cut off or graduate the supply of offensive material, in combination with the vessel J, and bellows A, the whole being constructed and arranged to operate substantially as described for the purposes set forth.

CALEB RUSSELL.

Witnesses:
J. DENNIS, Jr.,
J. F. CALLAN.